United States Patent
Gnanasambandam et al.

(10) Patent No.: US 12,541,816 B2
(45) Date of Patent: Feb. 3, 2026

(54) SYNTHETIC DATA GENERATION FOR MACHINE LEARNING-BASED POST-PROCESSING

(71) Applicant: Samsung Electronics Co., Ltd., Suwon-si (KR)

(72) Inventors: Abhiram Gnanasambandam, Frisco, TX (US); John W. Glotzbach, Allen, TX (US); John Seokjun Lee, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 18/363,596

(22) Filed: Aug. 1, 2023

(65) Prior Publication Data

US 2025/0045867 A1  Feb. 6, 2025

(51) Int. Cl.
| | |
|---|---|
| *G06T 3/4038* | (2024.01) |
| *G06T 3/4015* | (2024.01) |
| *G06T 5/60* | (2024.01) |
| *G06T 5/70* | (2024.01) |
| *G06T 5/73* | (2024.01) |
| *H04N 23/84* | (2023.01) |

(52) U.S. Cl.
CPC .......... *G06T 3/4038* (2013.01); *G06T 3/4015* (2013.01); *G06T 5/60* (2024.01); *G06T 5/70* (2024.01); *G06T 5/73* (2024.01); *H04N 23/84* (2023.01); *G06T 2207/20081* (2013.01); *G06T 2207/20084* (2013.01)

(58) Field of Classification Search
None
See application file for complete search history.

(56) References Cited

U.S. PATENT DOCUMENTS

| 11,443,414 B2 | 9/2022 | Novikov et al. |
| 11,604,947 B2 | 3/2023 | Wang et al. |
(Continued)

FOREIGN PATENT DOCUMENTS

| CN | 115496656 A | 12/2022 |
| CN | 115941934 A | 4/2023 |

OTHER PUBLICATIONS

International Search Report and Written Opinion of the International Searching Authority dated Nov. 11, 2024 in connection with International Patent Application No. PCT/KR2024/011317, 6 pages.
(Continued)

*Primary Examiner* — Mark R Milia

(57) ABSTRACT

A method includes obtaining a ground truth image and generating multiple image frames using the ground truth image, a modeled optical blur, and a modeled global motion. The method also includes generating multiple mosaic image frames using the image frames and a color filter array and generating multiple raw input image frames using the mosaic image frames and a noise model associated with at least one imaging sensor. The method further includes providing the raw input image frames to a multi-frame processing pipeline in order to generate synthetic training data. In addition, the method includes training a machine learning-based image processing engine using the ground truth image and the synthetic training data.

20 Claims, 8 Drawing Sheets

(56) References Cited

U.S. PATENT DOCUMENTS

| | | |
|---|---|---|
| 2019/0180109 A1 | 6/2019 | Sinha et al. |
| 2020/0057831 A1 | 2/2020 | Wu et al. |
| 2020/0265567 A1 | 8/2020 | Hu et al. |
| 2020/0342652 A1 | 10/2020 | Rowell et al. |
| 2021/0279851 A1 | 9/2021 | Oniki |
| 2023/0035482 A1 | 2/2023 | Glotzbach et al. |
| 2023/0091909 A1 | 3/2023 | Chennagiri et al. |
| 2023/0206392 A1 | 6/2023 | Cho et al. |
| 2023/0252608 A1* | 8/2023 | Li .................... G06T 5/77 382/275 |
| 2024/0062342 A1* | 2/2024 | Jangid ................ G06T 5/70 |
| 2025/0022098 A1* | 1/2025 | Li .................... G06T 5/50 |

OTHER PUBLICATIONS

Kee et al., "Modeling and Removing Spatially-Varying Optical Blur," 2011 IEEE International Conference on Computational Photography (ICCP), Apr. 2011, 8 pages.

* cited by examiner

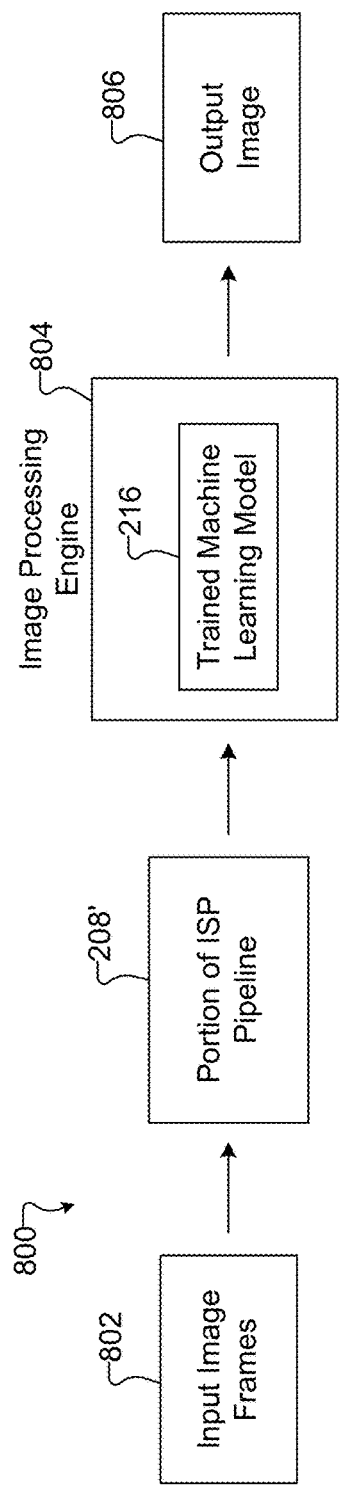
FIG. 8
FIG. 9A
FIG. 9B

SYNTHETIC DATA GENERATION FOR MACHINE LEARNING-BASED POST-PROCESSING

TECHNICAL FIELD

This disclosure relates generally to machine learning systems and processes. More specifically, this disclosure relates to synthetic data generation for machine learning-based post-processing.

BACKGROUND

Mobile electronic devices, such as smartphones and tablet computers, have become the most prevalent device type for capturing, uploading, and sharing digital images. "Computational photography" refers to an image generation technique commonly used in these and other types of devices in which one or more digital images of a scene are captured and processed digitally in order to produce desired effects within one or more final images of the scene. Computational photography has advanced in the past several years to significantly close the gap against traditional digital single lens reflex (DSLR) cameras. For example, computational photography techniques have been developed to effectively support functions such as zooming, low-light photography, and the use of under-display cameras.

SUMMARY

This disclosure relates to synthetic data generation for machine learning-based post-processing.

In a first embodiment, a method includes obtaining a ground truth image and generating multiple image frames using the ground truth image, a modeled optical blur, and a modeled global motion. The method also includes generating multiple mosaic image frames using the image frames and a color filter array and generating multiple raw input image frames using the mosaic image frames and a noise model associated with at least one imaging sensor. The method further includes providing the raw input image frames to a multi-frame processing pipeline in order to generate synthetic training data. In addition, the method includes training a machine learning-based image processing engine using the ground truth image and the synthetic training data. In another embodiment, a non-transitory machine readable medium includes instructions that when executed cause at least one processor to perform the method of the first embodiment.

In a second embodiment, an electronic device includes at least one processing device configured to obtain a ground truth image and to generate multiple image frames using the ground truth image, a modeled optical blur, and a modeled global motion. The at least one processing device is also configured to generate multiple mosaic image frames using the image frames and a color filter array and to generate multiple raw input image frames using the mosaic image frames and a noise model associated with at least one imaging sensor. The at least one processing device is further configured to provide the raw input image frames to a multi-frame processing pipeline in order to generate synthetic training data. In addition, the at least one processing device is configured to train a machine learning-based image processing engine using the ground truth image and the synthetic training data.

In a third embodiment, a method includes obtaining multiple input image frames and generating a blended image based on the input image frames using a machine learning-based image processing engine. The machine learning-based image processing engine includes a machine learning model that has been trained using a ground truth image and synthetic training data that is generated based on (i) the ground truth image, (ii) a modeled optical blur, (iii) a modeled global motion, (iv) a color filter array, and (v) a noise model associated with at least one imaging sensor. In another embodiment, an apparatus includes at least one processing device configured to perform the method of the third embodiment. In still another embodiment, a non-transitory machine readable medium includes instructions that when executed cause at least one processor to perform the method of the third embodiment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 8 illustrates an example architecture for using a machine learning-based image processing engine with a machine learning model trained based on synthetic data generation according to this disclosure;

FIGS. 9A and 9B illustrate example results that can be obtained using synthetic data generation for machine learning-based post-processing according to this disclosure;

DETAILED DESCRIPTION

Figure 1:
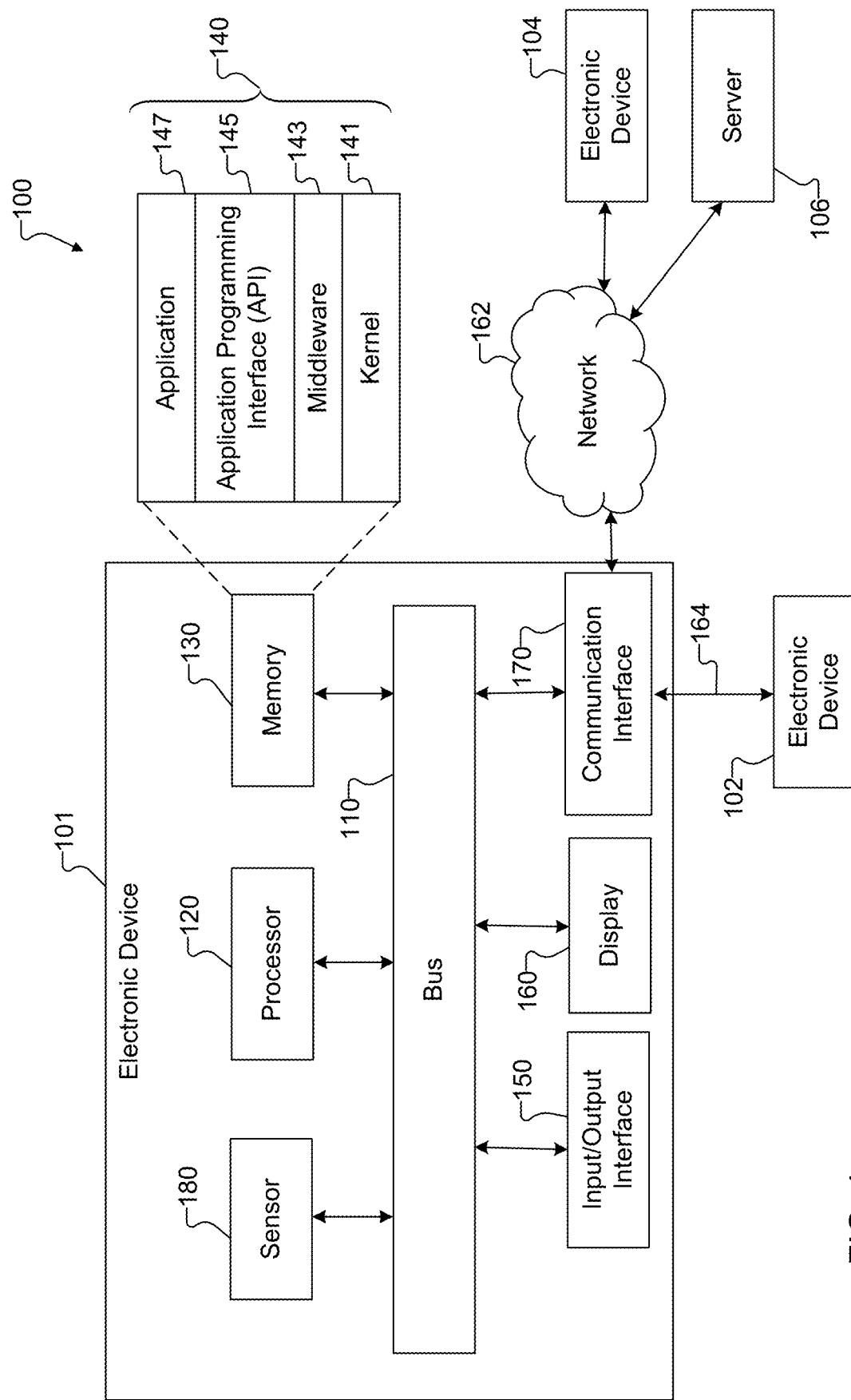
FIG. 1 illustrates an example network configuration including an electronic device according to this disclosure.

FIGS. 1 through 11, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, mobile electronic devices, such as smartphones and tablet computers, have become the most prevalent device type for capturing, uploading, and sharing digital images. "Computational photography" refers to an image generation technique commonly used in these and other types of devices in which one or more digital images of a scene are captured and processed digitally in order to produce desired effects within one or more final images of the scene. Computational photography has advanced in the past several years to significantly close the gap against traditional digital single lens reflex (DSLR) cameras. For example, computational photography techniques have been developed to effectively support functions such as zooming, low-light photography, and the use of under-display cameras.

Often times, computational photography techniques use imaging pipelines that perform multiple functions, such as a multi-frame blending operation, an image reconstruction operation, and a post-processing operation. Advanced computational photography pipelines often use multi-frame processing (MFP) based on captured raw image frames for noise and dynamic range improvements, and these pipelines may use machine learning-based deep learning for image reconstruction with accurate details. Image reconstruction can be useful to support various functions, such as super-resolution or noise reduction. In building such advanced pipelines, one challenge often involves the preparation of high-quality training data to be used to train a machine learning model in order to perform the image reconstruction.

Standalone algorithms tend to produce unexpected artifacts that are hard to control in complex computational photography pipelines, and generating training data for machine learning models is often a difficult task (particularly for image-based post-processing tasks like image super-resolution). Among other things, this is because these types of tasks often occur in one large block of processing operations within a standard pipeline. Simulating image and noise statistics for these tasks can be difficult for various reasons. For example, it is often difficult to capture the modifications to image data introduced by an ISP pipeline. Also, most existing data generation processes assume that a single image frame is captured and processed, but many mobile devices today capture and process multiple image frames to generate a single output image. As a result, these data generation processes do not capture the effects of this multi-frame processing. In addition, capturing real data can be difficult since one goal here is often to enhance output images generated by current imaging pipelines, and it is not clear how to obtain clean "ground truth" images to be used during a machine learning model training process.

In some cases, input image frames and ground truth images are captured manually, multi-frame blending and demosaicing are performed on the input image frames in order to generate input images, and the input images and the ground truth images are reviewed manually prior to inclusion in training data for a machine learning model. The manual review is typically performed so that out-of-sync image pairs (each pair including an input image and a ground truth image) can be removed from the training data. This is a costly and time-consuming process, and the quality of the resulting trained machine learning model is heavily dependent upon the quality of the training data obtained here.

This disclosure provides various techniques for synthetic data generation for machine learning-based post-processing. As described in more detail below, a ground truth image can be obtained, and multiple image frames can be generated using the ground truth image, a modeled optical blur, and a modeled global motion. For example, the modeled optical blur can be applied to the ground truth image in order to generate a blurred image frame, and different global motions can be introduced to the blurred image frame in order to generate different ones of the image frames. In some cases, the modeled optical blur can be applied to the ground truth image using an optics model, which can represent the modeled optical blur that is associated with at least one imaging sensor.

Multiple mosaic image frames can be generated using the image frames and a color filter array, such as when the color filter array is applied to the image frames in order to convert the image frames into red-green-blue (RGB) mosaic image frames. Multiple raw input image frames can be generated using the mosaic image frames and a noise model associated with the at least one imaging sensor, such as by applying noise to the mosaic image frames using the noise model based on one or more parameters of the at least one imaging sensor. The raw input image frames can be provided to a multi-frame processing pipeline in order to generate synthetic training data. For instance, the raw input image frames may be provided to the multi-frame processing pipeline, and the multi-frame processing pipeline may include multiple stages. A specified one of the stages may be tapped based on at least one task to be performed by the machine learning-based image processing engine, and an input or an output of the specified stage may be obtained as the synthetic training data. A machine learning-based image processing engine can be trained using the ground truth image and the synthetic training data. For example, the machine learning-based image processing engine may be trained to perform one or more tasks associated with one or more of the stages in the multi-frame processing pipeline that follow the specified stage.

The trained machine learning-based image processing engine may be used in any suitable manner. For example, multiple input image frames can be obtained, such as from one or more imaging sensors of an electronic device. A blended image can be generated based on the input image frames using a machine learning-based image processing engine. The machine learning-based image processing engine includes a machine learning model that has been trained using a ground truth image and synthetic training data that is generated based on (i) the ground truth image, (ii) a modeled optical blur, (iii) a modeled global motion, (iv) a color filter array, and (v) a noise model associated with at least one imaging sensor. For example, the machine learning model of the machine learning-based image processing engine may be trained as described above. In some cases, the machine learning model of the machine learning-based image processing engine may be trained to perform at least one of: raw image frame processing, multi-frame alignment, demosaicing, tone-mapping, and noise reduction.

In this way, the disclosed techniques enable the generation of synthetic input image frames for a multi-frame ISP pipeline, such as by generating the synthetic input image frames through the use of a ground truth image, modeled optical blur associated with image capture, random global motion introduced into the ground truth image, effects of using a color filter array during image capture, and noise introduced via a noise model. This can be repeated across any desired number of ground truth images and used to create any desired number of synthetic input image frames. This allows more-realistic synthetic input image frames to be created based on factors like the optics and noise characteristics of actual imaging sensors to be subsequently used to generate images of scenes. Moreover, the multi-frame ISP pipeline can be tapped at a specific point within the ISP pipeline based on which functions of the ISP pipeline are to be replaced using a machine learning model. This allows, for instance, one or more functions of the ISP pipeline to be used to generate synthetic training data based on the ground truth images and the synthetic input image frames, and the synthetic training data generated by the ISP pipeline can be used as input to the machine learning model being trained. Overall, this allows multi-frame processing operations or other ISP pipeline operations to be taken into account when training the machine learning model, which allows the machine learning model to be trained more effectively to process data and generate desired results.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) performs training of a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to training a machine learning model using synthetic data generation and/or use of a trained machine learning model to perform machine learning-based post-processing.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to training and/or use of a machine learning model. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to training a machine learning model using synthetic data generation and/or use of a trained machine learning model to perform machine learning-based post-processing.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
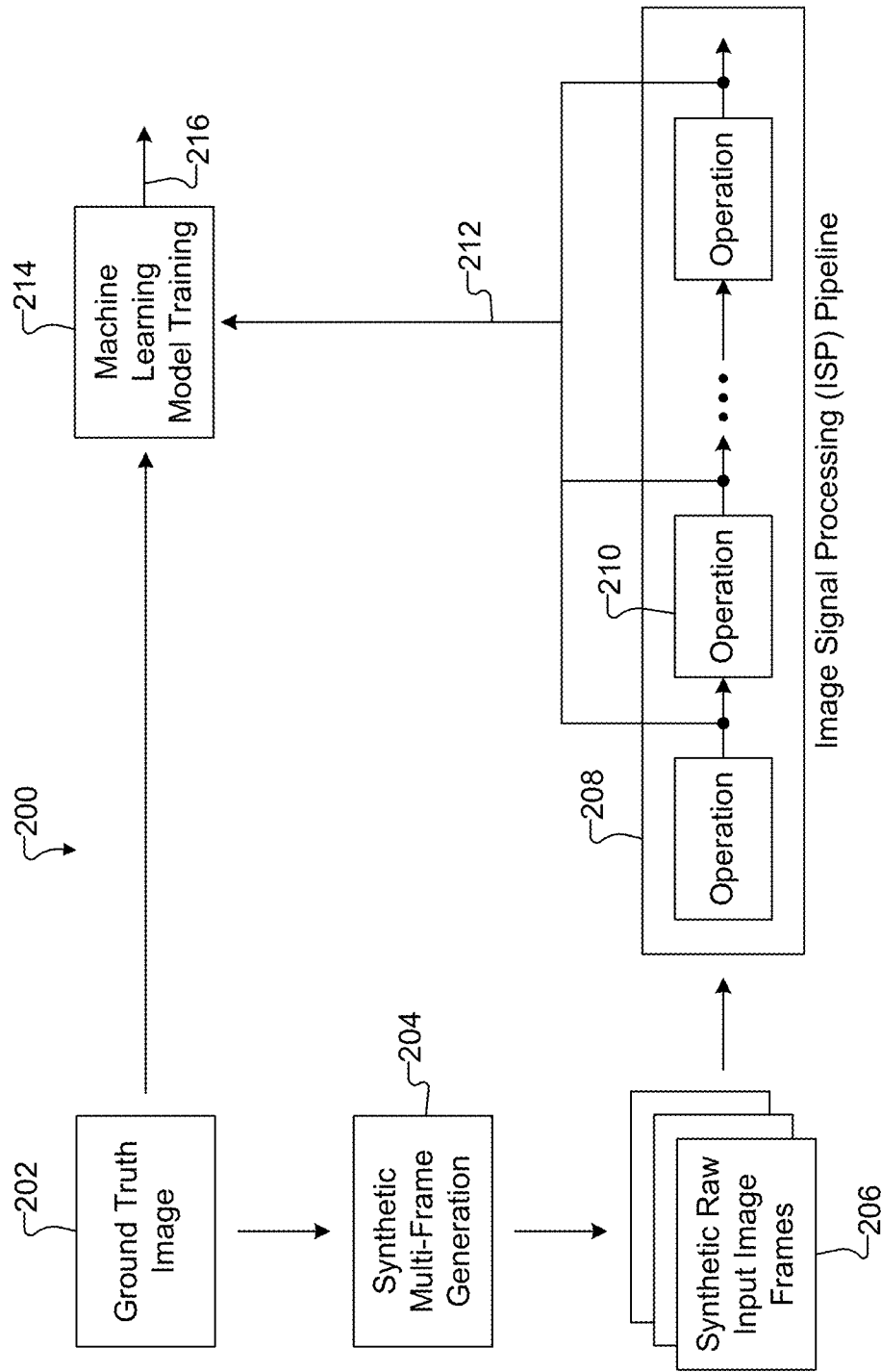
FIG. 2 illustrates an example architecture for synthetic data generation for machine learning-based post-processing according to this disclosure.

FIG. 2 illustrates an example architecture 200 for synthetic data generation for machine learning-based post-processing according to this disclosure. For ease of explanation, the architecture 200 shown in FIG. 2 is described as being used by the server 106 in the network configuration 100 shown in FIG. 1 in order to train a machine learning model for a machine learning-based image processing engine. However, the architecture 200 could be used by any other suitable device(s) (such as the electronic device 101) and in any other suitable system(s), and the architecture 200 may be used to train any other suitable machine learning model(s).

As shown in FIG. 2, the architecture 200 obtains and processes a ground truth image 202. In some cases, the ground truth image 202 may represent a clean image of a scene with little or no blur and little or no noise. Also, in some cases, the ground truth image 202 may represent a very bright image in which most or all image details of the scene are clearly visible. The ground truth image 202 may be obtained in any suitable manner, such as when captured using at least one imaging sensor 180 of an electronic device 101 or other device or when retrieved from a library or other storage location. The ground truth image 202 can have any suitable resolution and format. As a particular example, the ground truth image 202 may represent an RGB image having a twelve-megapixel resolution.

Figure 3:
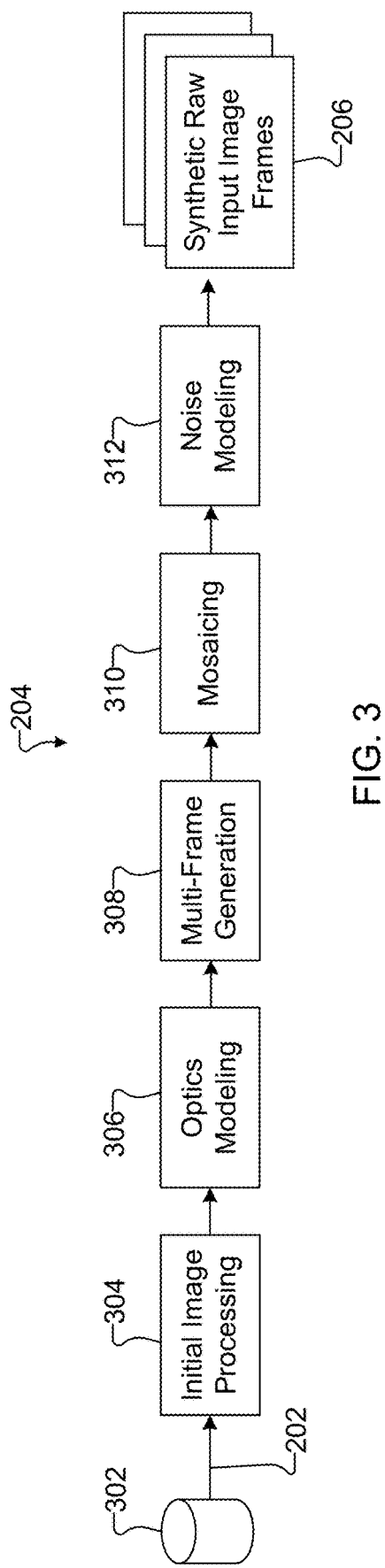
FIG. 3 illustrates an example synthetic multi-frame generation operation in the architecture of FIG. 2 according to this disclosure.

The ground truth image 202 is provided to a synthetic multi-frame generation operation 204, which generally operates to process the ground truth image 202 and generate multiple synthetic raw input image frames 206. The synthetic raw input image frames 206 represent modified versions of the ground truth image 202, such as when the synthetic multi-frame generation operation 204 creates optical blur, motion, noise, and other artifacts within the ground truth image 202 in order to generate the synthetic raw input image frames 206. The synthetic multi-frame generation operation 204 can use any suitable techniques to create optical blur, motion, noise, and other artifacts within the ground truth image 202 in order to generate the synthetic raw input image frames 206. One example implementation of the synthetic multi-frame generation operation 204 is shown in FIG. 3, which is described below. Note that the synthetic multi-frame generation operation 204 may optionally perform one or more task-specific functions here in order to generate the synthetic raw input image frames 206, where the one or more task-specific functions are based on the function or functions to be learned by a machine learning model. For instance, if the machine learning model will be trained to perform super-resolution, the synthetic multi-frame generation operation 204 may perform down-resolution using the ground truth image 202 in order to produce lower-resolution synthetic raw input image frames 206.

The synthetic raw input image frames 206 are provided to an image signal processing (ISP) pipeline 208, which represents a multi-frame processing pipeline. The ISP pipeline 208 generally operates to process multiple input image frames in order to generate blended output images or other output images using the image input frames. However, in this example, at least a portion of the ISP pipeline 208 is being replaced by a machine learning model, and the ISP pipeline 208 is being used here to generate synthetic training data for use in training the machine learning model. More specifically, the ISP pipeline 208 includes multiple stages, each of which is used to perform one or more operations 210. The ISP pipeline 208 may include any desired number of stages, and each stage may perform any desired operation or operations. As described below, some operations 210 in the ISP pipeline 208 may include raw image frame processing, multi-frame alignment, demosaicing, tone-mapping, and noise reduction operations. However, this is for illustration and explanation only, and the ISP pipeline 208 may include any other or additional operations 210 as needed or desired.

In this example, the inputs to one of the stages and/or the outputs from one of the stages in the ISP pipeline 208 may be tapped and used as synthetic training data 212 by a machine learning model training operation 214. The specific inputs and/or outputs selected for use as the synthetic training data 212 can vary based on which operation or operations a machine learning model will be trained to perform by the machine learning model training operation 214. For example, if the machine learning model will be trained to perform the last operation 210 of the ISP pipeline 208 only, the outputs from the preceding operation 210 may be selected and used as the synthetic training data 212. If the machine learning model will be trained to perform all operations 210 but the first operation 210 of the ISP pipeline 208, the outputs from the first operation 210 may be selected and used as the synthetic training data 212. The ability to selectively tap the ISP pipeline 208 and obtain the synthetic training data 212 at that tap location allows the machine learning model to be trained based on data that has been modified by at least part of the ISP pipeline 208. As a result, the machine learning model can be trained while taking into account expected operations performed by multi-frame processing operations or other ISP pipeline operations within the ISP pipeline 208, which allows the machine learning model to be trained more effectively.

In this example, the machine learning model training operation 214 receives the ground truth image 202 and the synthetic training data 212, and the machine learning model training operation 214 operates to train a machine learning model and generate a trained machine learning model 216. For example, the machine learning model training operation 214 can provide the synthetic training data 212 to the machine learning model being trained, and the machine learning model can process the synthetic training data 212 and generate an output image. The machine learning model training operation 214 can compare the generate output image to the ground truth image 202, and any differences or errors between the two images can be used to calculate a loss value for the machine learning model. Note that the loss value is typically determined based on errors between a number of output images generated by the machine learning model and their associated ground truth images 202. The loss value can be compared to a threshold, and weights or other parameters of the machine learning model can be adjusted if the loss value exceeds the threshold. The modified machine learning model can again be used to process the same synthetic training data 212 or other or additional synthetic training data 212, and the resulting output images can again be compared to their associated ground truth images 202 in order to identify an updated loss value. This can occur over any number of training iterations, and the loss value ideally decreases over time. Eventually, the loss value falls below the threshold, which is indicative that the machine learning model has been adequately trained to generate output images (at least to within a desired degree of accuracy as defined by the threshold).

As can be seen here, the ground truth image 202 is used to generate the synthetic raw input image frames 206. In some cases, this approach can be used to quickly and effectively generate image pairs, each of which can include the ground truth image 202 and one of the synthetic raw input image frames 206. Moreover, since the ground truth image 202 is used to generate the synthetic raw input image frames 206, this reduces or eliminates the number of out-of-sync images. As a result, this approach can be used to facilitate training of machine learning models in a faster and more effective manner. In addition, since the ISP pipeline 208 can be tapped at any desired location within the ISP pipeline 208, this approach allows different machine learning models to be trained to perform different functions or different sets of functions performed by the ISP pipeline 208.

Although FIG. 2 illustrates one example of an architecture 200 for synthetic data generation for machine learning-based post-processing, various changes may be made to FIG. 2. For example, various components or functions shown in FIG. 2 may be combined, further subdivided, rearranged, replicated, or omitted and additional components or functions can be added according to particular needs. Also, as noted above, various operations described above as being performed by the architecture 200 can be repeated for any number of ground truth images 202 in order to generate synthetic raw input image frames 206 for those ground truth images 202. In addition, the architecture 200 may use the same ground truth image 202 and generate different sets of synthetic raw input image frames 206, such as by applying different modifications to the ground truth image 202.

FIG. 3 illustrates an example synthetic multi-frame generation operation 204 in the architecture 200 of FIG. 2 according to this disclosure. As shown in FIG. 3, the synthetic multi-frame generation operation 204 can obtain a ground truth image 202, which may be obtained in any suitable manner. In this example, the ground truth image 202 is obtained from a repository 302, such as a database containing a library or other collection of ground truth images. Note, however, that the ground truth image 202 may be obtained from any suitable source and in any suitable manner. In some cases, the ground truth image 202 may represent an RGB image.

The ground truth image 202 is provided to an initial image processing operation 304, which generally operates to pre-process the ground truth image 202 and prepare the ground truth image 202 for further processing. In some cases, at least one specific function of the initial image processing operation 304 may vary based on the intended use of a machine learning model to be trained using the ground truth image 202. For example, if the machine learning model will be trained to perform super-resolution, the initial image processing operation 304 may perform down-resolution using the ground truth image 202. As a particular example, the initial image processing operation 304 may decrease twelve-megapixel ground truth images 202 and produce three-megapixel images. If the machine learning model will be trained to perform other functions (such as denoising), the initial image processing operation 304 may be omitted. The initial image processing operation 304 may perform any desired image-processing operation(s) or other operation(s) here to prepare the ground truth image 202 for further processing, or the initial image processing operation 304 may be omitted.

The ground truth image 202 (or the pre-processed version thereof) is provided to an optics modeling function 306, which generally operates to blur or otherwise modify the ground truth image 202 in order to imitate the effects of at least one imaging sensor. For example, the optics modeling function 306 may use an optics model associated with the at least one imaging sensor, where the optics model represents the optical blur that is created by one or more lenses or other components of the at least one imaging sensor. In some cases, the optics model may be associated with a specific type of electronic device 101, such as a specific model of smartphone or other electronic device model from a specific manufacturer. Applying the optics model to the ground truth image 202 can result in the generation of a blurred image frame. The optics model that is used here may be produced in any suitable manner, such as based on knowledge of the optical design and operational characteristics of one or more imaging sensors 180 of one or more electronic devices 101. In some embodiments, for instance, the optics model that is used here may be produced as described in Kee et al., "Modeling and Removing Spatially-Varying Optical Blur," 2011 IEEE International Conference on Computational Photography (ICCP), IEEE, 2011 (which is hereby incorporated by reference in its entirety).

The blurred image frame generated by the optics modeling function 306 is provided to a multi-frame generation function 308, which generally operates to convert the blurred image frame into multiple different image frames by introducing different global motions into the blurred image frame. For example, the multi-frame generation function 308 may convert the blurred image frame into a burst or other collection of image frames by shifting or translating the blurred image frame by random amounts in one or more directions. Among other things, this may help to imitate the presence of hand movements (such as handshake) or other movements during image capture operations, which is common with handheld or other portable electronic devices. As a result, these electronic devices routinely capture and need to process image frames in which some amount of movement occurs between the capture of different image frames. The multi-frame generation function 308 here can introduce random global motions into the blurred image frame, where each image frame that is produced by the multi-frame generation function 308 can have a random motion that is independent of the random motion of other image frames.

The image frames generated by the multi-frame generation function 308 are provided to a mosaicing function 310, which generally operates to convert the image frames from the multi-frame generation function 308 (which may represent RGB image frames) into mosaic image frames. For example, the mosaicing function 310 can apply a color filter array to the image frames from the multi-frame generation function 308 in order to generate the mosaic image frames. The mosaic image frames may represent or contain image data in a Bayer or other raw format, which may be the format expected by the ISP pipeline 208. As particular examples, the mosaic image frames can represent or contain image data in a Bayer, Tetra Bayer, or Nona Bayer raw format. The mosaicing function 310 here can apply any suitable color filter array to the image frames from the multi-frame generation function 308 in order to produce the mosaic image frames, such as a Bayer color filter array.

The mosaic image frames are provided to a noise modeling function 312, which generally operates to add noise to the mosaic image frames and generate the synthetic raw input image frames 206. Among other things, the noise modeling function 312 can be used to add realistic noise to the mosaic image frames, such as noise that would typically be generated by at least one imaging sensor. The noise modeling function 312 here can use a noise model to generate the noise, where the noise model is associated with the at least one imaging sensor. In some cases, the noise model can define the noise to be added to the mosaic image frames based on one or more parameters of the at least one imaging sensor, such as ISO level and/or exposure time. This allows the noise model to define different levels and/or types of noise to be added to the mosaic image frames based on how at least one imaging sensor might capture image frames. The noise modeling function 312 may also quantize image data of the mosaic image frames to a desired bit depth. For instance, when the ISP pipeline 208 expects 12-bit image data, the noise modeling function 312 can convert 14-bit image data or other image data in the mosaic image frames into 12-bit image data. The resulting synthetic raw input image frames 206 can be sent as inputs to the ISP pipeline 208 for processing.

Figure 4:
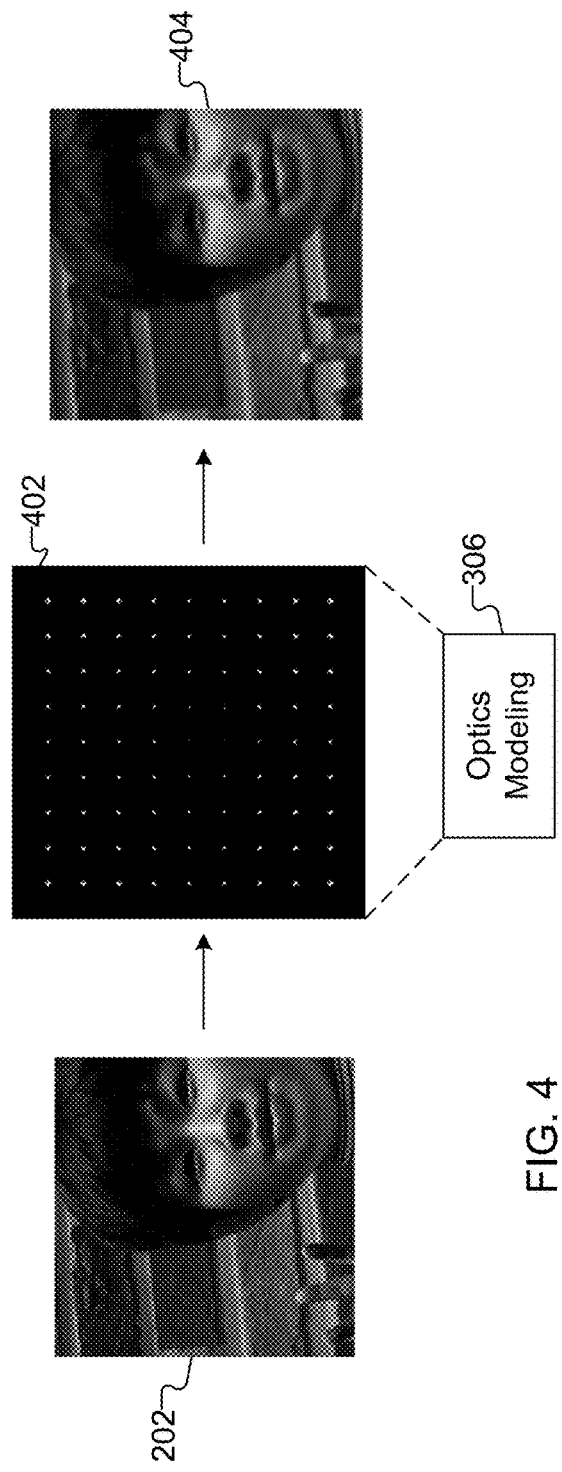
FIG. 4 illustrates an example optics modeling function in the synthetic multi-frame generation operation of FIG. 3 according to this disclosure.

FIG. 4 illustrates an example optics modeling function 306 in the synthetic multi-frame generation operation 204 of FIG. 3 according to this disclosure. As shown in FIG. 4, a specific example of a ground truth image 202 is shown. The optics modeling function 306 applies an optics model 402 to the ground truth image 202, where the optics model 402 defines how optical blur may be created during capture of a scene represented by the ground truth image 202. In this particular example, for instance, the optics model 402 indicates that little or no blurring may occur in the central region of an image frame but more blurring may occur as distance from the center of the image frame increases (with the worst blurring occurring in corners of the image frame). In some cases, the optics model 402 may be defined using a spatially-varying point spread function that models the optics of at least one imaging sensor. Applying the optics model 402 to the ground truth image 202 leads to the generation of a blurred image frame 404, where the ground truth image 202 has been blurred in the same manner defined by the optics model 402 to generate the blurred image frame 404.

Figure 5:
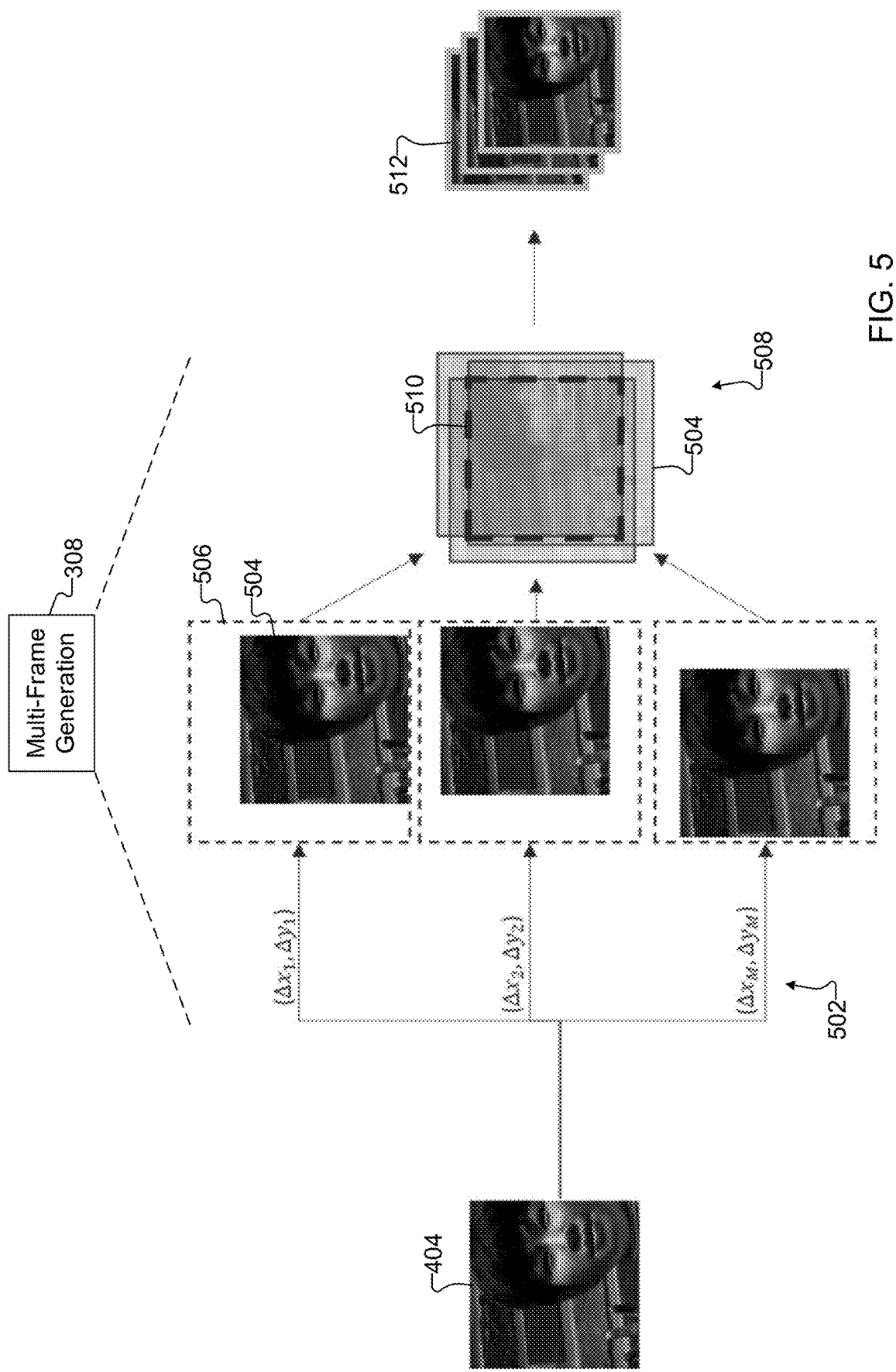
FIG. 5 illustrates an example multi-frame generation function in the synthetic multi-frame generation operation of FIG. 3 according to this disclosure.

FIG. 5 illustrates an example multi-frame generation function 308 in the synthetic multi-frame generation operation 204 of FIG. 3 according to this disclosure. As shown in FIG. 5, the blurred image frame 404 generated as shown in FIG. 4 is subjected to a random shifting or translation function 502, resulting in the generation of translated image frames 504. The random shifting or translation function 502 generally operates to shift or translate the blurred image frame 404 by random amounts in the x direction and/or the y direction of a given area 506. Here, the random shifts are defined using $\Delta x$ and $\Delta y$ values, and these values may be randomly selected in order to impart random global jitter or other random motion to the translated image frames 504, thereby simulating motion. A cropping function 508 crops each of the translated image frames 504 to exclude portions of each translated image frame 504 outside a defined boundary 510. This results in the generation of image frames 512, which represent blurred and randomly-shifted versions of the ground truth image 202.

Figure 6:
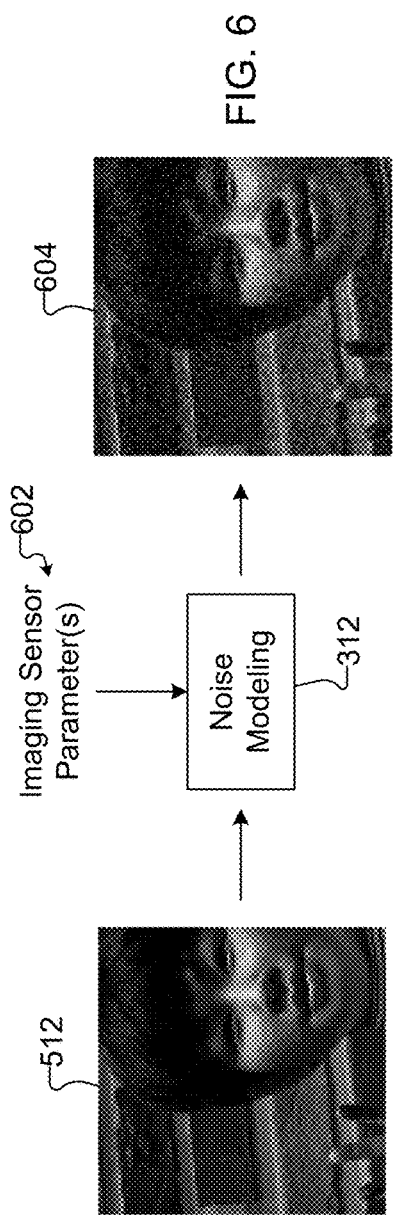
FIG. 6 illustrates an example noise modeling function in the synthetic multi-frame generation operation of FIG. 3 according to this disclosure.

FIG. 6 illustrates an example noise modeling function 312 in the synthetic multi-frame generation operation 204 of FIG. 3 according to this disclosure. As shown in FIG. 6, each of the image frames 512 generated as shown in FIG. 5 may be processed by the noise modeling function 312 in order to add noise to the image frame 512. For example, the noise modeling function 312 may apply one or more imaging sensor parameters 602 (such as ISO and/or exposure time) to a noise model in order to identify one or more types, quantities, or other parameters of noise to be added to the image frame 512. The noise modeling function 312 may also quantize the image data in the image frame 512 to a desired bit depth. This results in the generation of a noisy image frame 604 for each of the image frames 512. The noisy image frames 604 may represent the synthetic raw input image frames 206 that are provided to the ISP pipeline 208 for processing.

Although FIGS. 3 through 6 illustrate one example of a synthetic multi-frame generation operation 204 in the architecture 200 of FIG. 2 and related details, various changes may be made to FIGS. 3 through 6. For example, various components or functions shown in each of FIGS. 3 through 6 may be combined, further subdivided, rearranged, replicated, or omitted and additional components or functions can be added according to particular needs. Also, each of the optics modeling, multi-frame generation, and noise modeling functions may be implemented in any suitable manner.

Figure 7:
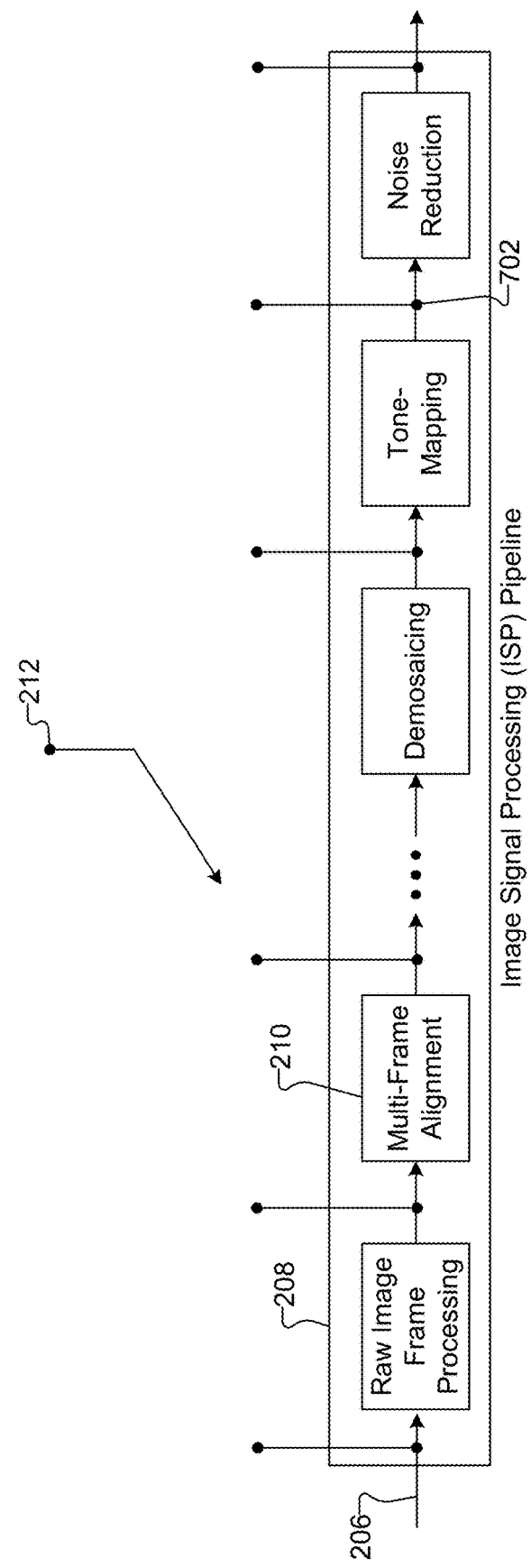
FIG. 7 illustrates an example multi-stage image signal processing (ISP) pipeline in the architecture of FIG. 2 according to this disclosure.

FIG. 7 illustrates an example multi-stage ISP pipeline 208 in the architecture 200 of FIG. 2 according to this disclosure. As shown in FIG. 7, the ISP pipeline 208 includes a number of stages that perform various image processing operations 210 using the synthetic raw input image frames 206. In this example, the operations 210 include a raw image frame processing operation, a multi-frame alignment operation, a demosaicing operation, a tone-mapping operation, and a noise reduction operation.

The raw image frame processing operation generally includes one or more operations that pre-process the image data of raw image frames, such as the synthetic raw input image frames 206. This may include any suitable pre-processing operation or operations, such as adjusting the exposure, contrast, or color of the raw image frames. The multi-frame alignment operation generally operates to align raw image frames, such as by shifting or warping at least some of the raw image frames so that common features or points in the raw image frames are aligned with each other. The demosaicing operation generally operates to reconstruct image data from partial (incomplete) image data created when a color filter array is used with an imaging sensor. The tone-mapping operation generally operates to adjust the color tones of one or more of the raw image frames. This may be needed, for example, if different raw image frames are associated with different brightness levels or different dynamic ranges. The noise reduction operation generally operates to reduce noise within the raw image frames. Note that various ISP pipelines 208 have been developed and that the specific operations 210 described above are examples only and do not limit the scope of this disclosure to this particular ISP pipeline 208.

Various tap points 702 are present within the ISP pipeline 208, where each tap point 702 represents a location where (i) data is provided as input to a particular stage in the ISP pipeline 208 and/or (ii) data is received as output from a particular stage in the ISP pipeline 208. Here, the ISP pipeline 208 can be tapped at a specified one of the stages, either by selecting the inputs to that specified stage or by selecting the outputs from that specified stage. Effectively, this creates a virtual switch between the tap points 702 of the ISP pipeline 208 and the machine learning model training operation 214, where the synthetic training data 212 that is actually provided to the machine learning model training operation 214 can vary based on where the ISP pipeline 208 is tapped in order to obtain the synthetic training data 212.

Any stage of the ISP pipeline 208 that follows the selected tap point 702 may be replaced by the trained machine learning model 216 (once training by the machine learning model training operation 214 is completed). Thus, for instance, if the first tap point 702 on the left is selected and used, the entire ISP pipeline 208 can be bypassed, which means that the synthetic training data 212 would include the synthetic raw input image frames 206. In this case, the trained machine learning model 216 may be trained to perform the functions of the entire ISP pipeline 208. If the second tap point 702 is used, all stages of the ISP pipeline 208 except the first stage can be bypassed, which means that the synthetic training data 212 would include the outputs of the first operation 210. In that case, the trained machine learning model 216 may be trained to perform the functions of all stages of the ISP pipeline 208 except the first stage. As a result, one or more stages of the ISP pipeline 208 following the selected tap point 702 may be replaced by the trained machine learning model 216, and the number of stages replaced by the trained machine learning model 216 can vary depending on the selected tap point 702.

Although FIG. 7 illustrates one example of a multi-stage ISP pipeline 208 in the architecture 200 of FIG. 2, various changes may be made to FIG. 7. For example, various components or functions shown in FIG. 7 may be combined, further subdivided, rearranged, replicated, or omitted and additional components or functions can be added according to particular needs. Also, as noted above, the specific examples of the operations 210 shown in the ISP pipeline 208 are for illustration only and can vary depending on the specific implementation of the ISP pipeline 208.

FIG. 8 illustrates an example architecture 800 for using a machine learning-based image processing engine with a machine learning model trained based on synthetic data generation according to this disclosure. For ease of explanation, the architecture 800 shown in FIG. 8 is described as being used by the electronic device 101 in the network configuration 100 shown in FIG. 1 in order to use a trained machine learning model for a machine learning-based image processing engine. However, the architecture 800 could be used by any other suitable device(s) (such as the server 106) and in any other suitable system(s), and the architecture 800 may use any other suitable trained machine learning model(s).

As shown in FIG. 8, the architecture 800 obtains and processes input image frames 802. Each input image frame 802 represents an image frame captured of a scene. Depending on the implementation, the input image frames 802 could be captured simultaneously using different cameras or other imaging sensors 180 of the electronic device 101 or captured sequentially using one or more cameras or other imaging sensors 180 of the electronic device 101. In some cases, the input image frames 802 can be captured in response to a capture event, such as when the processor 120 detects a user initiating image capture by depressing a hard or soft button of the electronic device 101. The input image frames 802 may have any suitable resolution(s), and the resolution of each input image frame 802 can depend on the capabilities of the imaging sensor(s) 180 in the electronic device 101 and possibly on one or more user settings affecting the resolution. In some embodiments, the input image frames 802 may represent raw image frames, although image frames in any other suitable image data space may be used.

The input image frames 802 may optionally be processed by a portion 208' of the ISP pipeline 208. As described above, one or more stages of the ISP pipeline 208 may be replaced using the trained machine learning model 216. Depending on how much of the ISP pipeline 208 is replaced by the trained machine learning model 216, the ISP pipeline 208 may be omitted entirely in the architecture 800, or just the portion 208' of the ISP pipeline 208 may be included in the architecture 800. Any remaining portion 208' of the ISP pipeline 208 included in the architecture 800 can represent the one or more stages of the ISP pipeline 208 that were not replaced by the trained machine learning model 216 (meaning any stage or stages of the ISP pipeline 208 prior to the selected tap point 702). As particular examples, if the first tap point 702 is selected in FIG. 7, the entire ISP pipeline 208 is replaced by the machine learning model 216, and no portion of the ISP pipeline 208 may be used in the architecture 800. If another tap point 702 is selected in FIG. 7, one or more stages following the selected tap point 702 may remain in the architecture 800 and be represented by the portion 208' of the ISP pipeline.

The input image frames 802 (or the outputs of the portion 208' of the ISP pipeline 208 based on the input image frames 802) are provided to a machine learning-based image processing engine 804, which includes or is represented by the trained machine learning model 216. The trained machine learning model 216 processes the input image frames 802 or the outputs of the portion 208' of the ISP pipeline 208 in order to generate an output image 806. In some cases, the output image 806 represents a blended version of the input image frames 802, where the trained machine learning model 216 of the image processing engine 804 generates the blended version of the input image frames 802 by performing one or more operations 210 that were previously performed by the ISP pipeline 208. For example, the trained machine learning model 216 of the image processing engine 804 may be trained (as described above) to perform at least one of: raw image frame processing, multi-frame alignment, demosaicing, tone-mapping, and noise reduction. Note that this can be performed any desired number of times using any number of input image frames 802 in order to generate any desired number of output images 806.

Although FIG. 8 illustrates one example of an architecture 800 for using a machine learning-based image processing engine 804 with a machine learning model 216 trained based on synthetic data generation, various changes may be made to FIG. 8. For example, various components or functions shown in FIG. 8 may be combined, further subdivided, rearranged, replicated, or omitted and additional components or functions can be added according to particular needs.

It should be noted that the functions shown in FIGS. 2 through 8 or described above can be implemented in an electronic device 101, 102, 104, server 106, or other device(s) in any suitable manner. For example, in some embodiments, at least some of the functions shown in FIGS. 2 through 8 or described above can be implemented or supported using one or more software applications or other software instructions that are executed by the processor 120 of the electronic device 101, 102, 104, server 106, or other device(s). In other embodiments, at least some of the functions shown in FIGS. 2 through 8 or described above can be implemented or supported using dedicated hardware components. In general, the functions shown in FIGS. 2 through 8 or described above can be performed using any suitable hardware or any suitable combination of hardware and software/firmware instructions. Also, the functions shown in FIGS. 2 through 8 or described above can be performed by a single device or by multiple devices.

FIGS. 9A and 9B illustrate example results that can be obtained using synthetic data generation for machine learning-based post-processing according to this disclosure. In this example, FIG. 9A contains an image frame 902, which may represent one example of an RGB output image produced using a standard ISP pipeline. As can be seen here, the image frame 902 is generally blurry and is not particularly sharp.

In contrast, FIG. 9B contains an image frame 904 generated using a trained machine learning model 216, where the trained machine learning model 216 is trained as shown in FIG. 2 and used during inferencing as shown in FIG. 8. As can be seen by comparing FIGS. 9A and 9B, the image frame 904 is of much higher quality than the image frame 902. Among other things, the image frame 904 is cleaner, removes more noise, and is sharper than the image frame 902. Thus, it can be seen here that a machine learning-based approach can be used to generate images of improved quality compared to standard ISP pipelines. Moreover, the approaches described above enable improved training of the machine learning model 216 to perform these or other functions.

Although FIGS. 9A and 9B illustrate one example of results that can be obtained using synthetic data generation for machine learning-based post-processing, various changes may be made to FIGS. 9A and 9B. For example, the contents of the image frames that are processed and generated can vary widely depending on the circumstances, such as the scene being imaged and the device or devices used to capture the images. Also, the results obtained using a standard ISP pipeline and the approaches described above can vary widely depending on the circumstances, such as depending on how well the machine learning model 216 is trained and the quality of its training data. The results shown in FIGS. 9A and 9B are merely meant to illustrate one example of the type of results that may be obtained using the machine learning model training and inferencing techniques described in this patent document.

Figure 10:
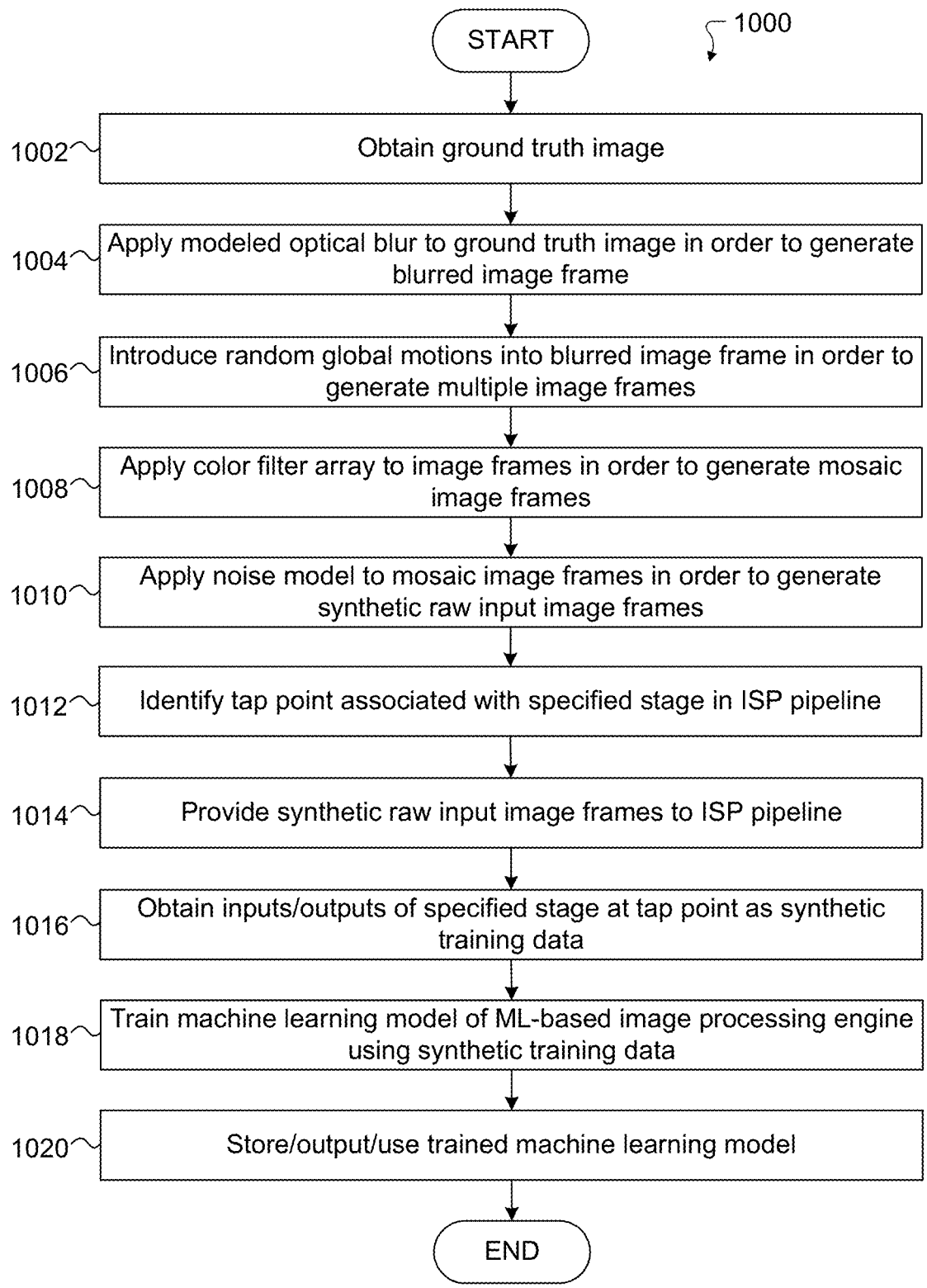
FIG. 10 illustrates an example method for training a machine learning model using synthetic data generation according to this disclosure.

FIG. 10 illustrates an example method 1000 for training a machine learning model using synthetic data generation according to this disclosure. For ease of explanation, the method 1000 is described as being performed by the server 106 in the network configuration 100 of FIG. 1. However, the method 1000 may be performed using any other suitable device(s) (such as the electronic device 101) and in any other suitable system(s).

As shown in FIG. 10, a ground truth image is obtained at step 1002. This may include, for example, the processor 120 of the server 106 obtaining the ground truth image 202 from a repository 302 or other source. Multiple image frames are generated using the ground truth image, a modeled optical blur, and a modeled global motion. For instance, modeled optical blur can be applied to the ground truth image in order to generate a blurred image frame at step 1004. This may include, for example, the processor 120 of the server 106 performing the optics modeling function 306 in order to apply an optical blur modeled by an optics model 402 to the ground truth image 202 in order to generate a blurred image frame 404. The optics model 402 may represent the modeled optical blur that is associated with at least one imaging sensor, such as at least one imaging sensor 180 of one or more electronic devices 101. Random global motions are introduced into the blurred image frame in order to generate the multiple image frames at step 1006. This may include, for example, the processor 120 of the server 106 performing the multi-frame generation function 308 so that the random shifting or translation function 502 and the cropping function 508 can introduce different global motions to the blurred image frame 404 and crop the resulting translated image frames 504 in order to generate different ones of the image frames 512.

Multiple mosaic image frames are generated using the image frames and a color filter array. For instance, a color filter array can be applied to the image frames in order to generate mosaic image frames at step 1008. This may include, for example, the processor 120 of the server 106 performing the mosaicing function 310 in order to apply a Bayer color filter array or other color filter array to the image frames 512 in order to convert the image frames 512 into RGB mosaic image frames or other mosaic image frames. Multiple raw input image frames are generated using the mosaic image frames and a noise model associated with at least one imaging sensor. For instance, a noise model may be applied to the mosaic image frames in order to generate synthetic raw input image frames at step 1010. This may include, for example, the processor 120 of the server 106 performing the noise modeling function 312 in order to apply noise to the mosaic image frames using a noise model. The noise model may identify noise to be added to the mosaic image frames based on one or more parameters of the at least one imaging sensor, such as ISO level and/or exposure time.

A tap point associated with a specified stage in an ISP pipeline is identified at step 1012. This may include, for example, the processor 120 of the server 106 identifying a tap point 702 in the ISP pipeline 208 where synthetic training data 212 will be obtained. In some cases, this determination may be based on user input or other information identifying which stage(s) of the ISP pipeline 208 will be replaced by a machine learning model. The synthetic raw input image frames are provided to the ISP pipeline at step 1014. This may include, for example, the processor 120 of the server 106 providing the synthetic raw input image frames 206 to the input of the first stage of the ISP pipeline 208. Inputs or outputs of a specified stage of the ISP pipeline are obtained as synthetic training data at the specified tap point at step 1016, and the synthetic training data is used to train a machine learning model of a machine learning (ML)-based image processing engine at step 1018. This may include, for example, the processor 120 of the server 106 performing the machine learning model training operation 214 to train a machine learning model 216 based on the synthetic training data 212 obtained at the specified tap point 702. The machine learning model 216 can be trained here to perform one or more operations 210 of the ISP pipeline 208, such as the operation(s) 210 associated with one or more stages of the ISP pipeline 208 following the specified tap point 702. As particular examples, the machine learning model 216 may be trained to perform one or more tasks associated with at least one of: a raw image frame processing stage, a multi-frame alignment stage, a demosaic stage, a tone-mapping stage, and a noise reduction stage of the ISP pipeline 208.

The trained machine learning model may be used in any suitable manner. For example, the trained machine learning model may be stored, output, or used at step 1020. This may include, for example, the processor 120 of the server 106 storing the trained machine learning model 216 and using the trained machine learning model 216 during inferencing. This may also or alternatively include the server 106 deploying the trained machine learning model 216 to one or more other devices (such as the electronic device 101) for inferencing. Among other things, the trained machine learning model 216 can be used to perform one or more post-processing operations to facilitate image generation.

Although FIG. 10 illustrates one example of a method 1000 for training a machine learning model using synthetic data generation, various changes may be made to FIG. 10. For example, while shown as a series of steps, various steps in FIG. 10 may overlap, occur in parallel, occur in a different order, or occur any number of times (including zero times).

Figure 11:
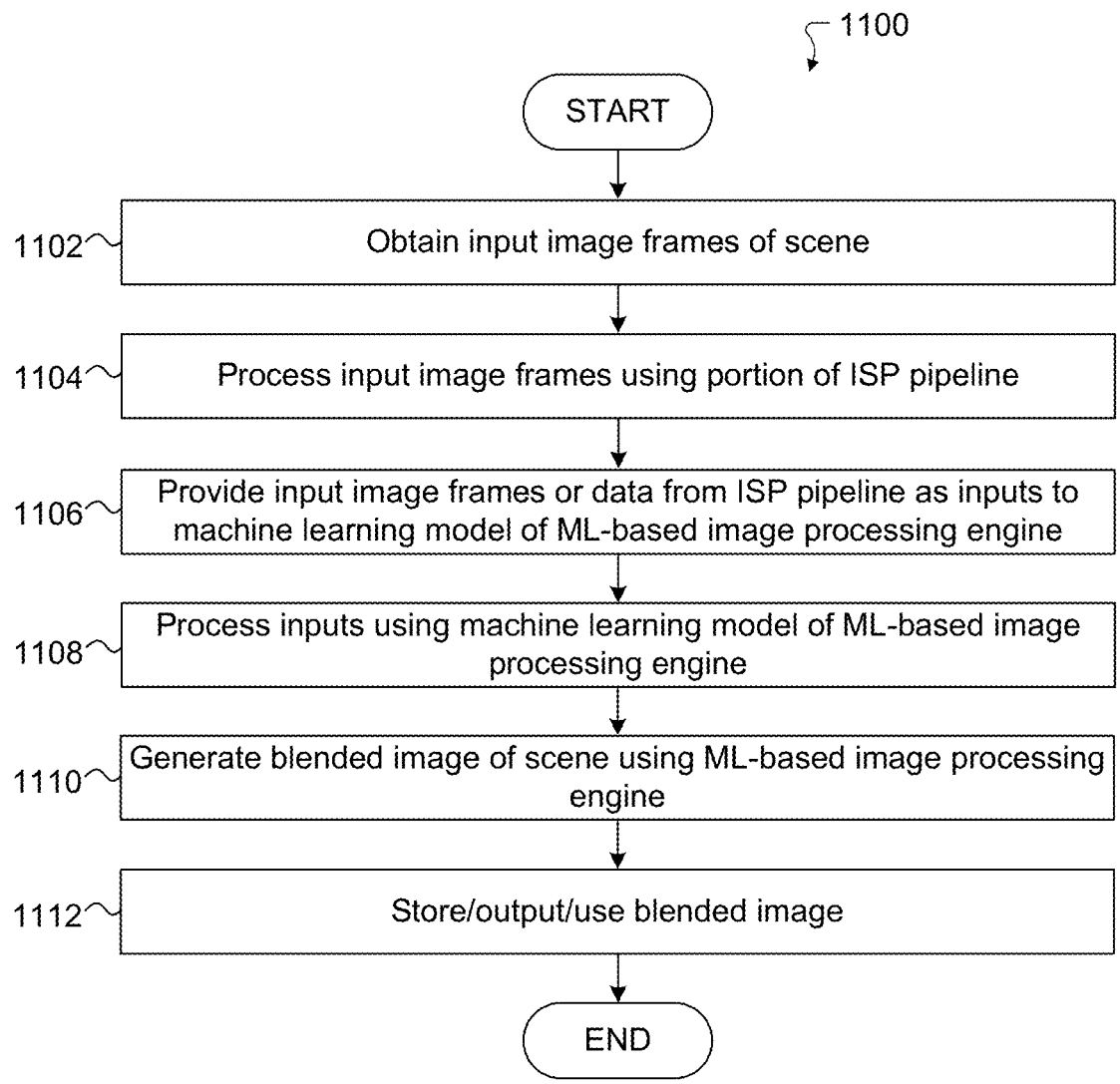
FIG. 11 illustrates an example method for using a trained machine learning model to perform machine learning-based post-processing according to this disclosure.

FIG. 11 illustrates an example method 1100 for using a trained machine learning model to perform machine learning-based post-processing according to this disclosure. For ease of explanation, the method 1100 is described as being performed by the electronic device 101 in the network configuration 100 of FIG. 1. However, the method 1100 may be performed using any other suitable device(s) (such as the server 106) and in any other suitable system(s).

As shown in FIG. 11, multiple input image frames of a scene are obtained at step 1102. This may include, for example, the processor 120 of the electronic device 101 obtaining input image frames 802 from one or more imaging sensors 180 of the electronic device 101. A blended image is generated based on the input image frames using a machine learning-based image processing engine. For instance, the input image frames may optionally be processed by a portion of an ISP pipeline at step 1104. This may include, for example, the processor 120 of the electronic device 101 processing the input image frames 802 using any remaining portion 208' of the ISP pipeline 208. As noted above, however, the entire ISP pipeline 208 may be omitted in the machine learning model 216 is trained to perform all stages of the ISP pipeline 208. The input image frames or data from the ISP pipeline is provided as inputs to a machine learning model of a machine learning-based image processing engine at step 1106. This may include, for example, the processor 120 of the electronic device 101 providing the input image frames 802 or the outputs from the portion 208' of the ISP pipeline 208 to the machine learning-based image processing engine 804. The machine learning model processes these inputs at step 1108 and generates a blended image of the scene at step 1110. This may include, for example, the machine learning model 216 of the machine learning-based image processing engine 804 processing the input image frames 802 or the outputs from the portion 208' of the ISP pipeline 208 in order to generate an output image 806.

The output image may be used in any suitable manner. For example, the output image may be stored, output, or used at step 1112. This may include, for example, the processor 120 of the electronic device 101 presenting the output image 806 on the display 160 of the electronic device 101, saving the output image 806 to a camera roll stored in a memory 130 of the electronic device 101, or attaching the output image 806 to a text message, email, or other communication to be transmitted from the electronic device 101. Note, however, that the output image 806 could be used in any other or additional manner.

Although FIG. 11 illustrates one example of a method 1100 for using a trained machine learning model to perform machine learning-based post-processing, various changes may be made to FIG. 11. For example, while shown as a series of steps, various steps in FIG. 11 may overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining a ground truth image;
   generating multiple image frames using the ground truth image, a modeled optical blur, and a modeled global motion;
   generating multiple mosaic image frames using the image frames and a color filter array;
   generating multiple raw input image frames using the mosaic image frames and a noise model associated with at least one imaging sensor;
   providing the raw input image frames to a multi-frame processing pipeline in order to generate synthetic training data; and
   training a machine learning-based image processing engine using the ground truth image and the synthetic training data.

2. The method of claim 1, wherein generating the image frames comprises:
   applying the modeled optical blur to the ground truth image in order to generate a blurred image frame; and
   introducing different global motions to the blurred image frame in order to generate different ones of the image frames.

3. The method of claim 2, wherein applying the modeled optical blur to the ground truth image comprises:
   applying an optics model to the ground truth image, the optics model representing the modeled optical blur that is associated with the at least one imaging sensor.

4. The method of claim 1, wherein generating the mosaic image frames comprises:
   applying the color filter array to the image frames in order to convert the image frames into red-green-blue (RGB) mosaic image frames.

5. The method of claim 1, wherein generating the raw input image frames comprises:
   applying noise to the mosaic image frames using the noise model based on one or more parameters of the at least one imaging sensor.

6. The method of claim 1, wherein:
   the multi-frame processing pipeline comprises multiple stages; and
   providing the raw input image frames to the multi-frame processing pipeline in order to generate the synthetic training data comprises:
      tapping a specified one of the stages in the multi-frame processing pipeline based on at least one task to be performed by the machine learning-based image processing engine; and
      obtaining an input or an output of the specified stage as the synthetic training data.

7. The method of claim 6, wherein:
   the multi-frame processing pipeline comprises a raw image frame processing stage, a multi-frame alignment stage, a demosaic stage, a tone-mapping stage, and a noise reduction stage;
   the specified stage represents one of the raw image frame processing stage, the multi-frame alignment stage, the demosaic stage, the tone-mapping stage, and the noise reduction stage; and
   training the machine learning-based image processing engine comprises training the machine learning-based image processing engine to perform one or more tasks associated with one or more of the stages in the multi-frame processing pipeline that follow the specified stage.

8. An electronic device comprising:
at least one processing device configured to:
obtain a ground truth image;
generate multiple image frames using the ground truth image, a modeled optical blur, and a modeled global motion;
generate multiple mosaic image frames using the image frames and a color filter array;
generate multiple raw input image frames using the mosaic image frames and a noise model associated with at least one imaging sensor;
provide the raw input image frames to a multi-frame processing pipeline in order to generate synthetic training data; and
train a machine learning-based image processing engine using the ground truth image and the synthetic training data.

9. The electronic device of claim 8, wherein, to generate the image frames, the at least one processing device is configured to:
apply the modeled optical blur to the ground truth image in order to generate a blurred image frame; and
introduce different global motions to the blurred image frame in order to generate different ones of the image frames.

10. The electronic device of claim 9, wherein, to apply the modeled optical blur to the ground truth image, the at least one processing device is configured to apply an optics model to the ground truth image, the optics model representing the modeled optical blur that is associated with the at least one imaging sensor.

11. The electronic device of claim 8, wherein, to generate the mosaic image frames, the at least one processing device is configured to apply the color filter array to the image frames in order to convert the image frames into red-green-blue (RGB) mosaic image frames.

12. The electronic device of claim 8, wherein, to generate the raw input image frames, the at least one processing device is configured to apply noise to the mosaic image frames using the noise model based on one or more parameters of the at least one imaging sensor.

13. The electronic device of claim 8, wherein:
the multi-frame processing pipeline comprises multiple stages; and
to provide the raw input image frames to the multi-frame processing pipeline in order to generate the synthetic training data, the at least one processing device is configured to:
tap a specified one of the stages in the multi-frame processing pipeline based on at least one task to be performed by the machine learning-based image processing engine; and
obtain an input or an output of the specified stage as the synthetic training data.

14. The electronic device of claim 13, wherein:
the multi-frame processing pipeline comprises a raw image frame processing stage, a multi-frame alignment stage, a demosaic stage, a tone-mapping stage, and a noise reduction stage;
the specified stage represents one of the raw image frame processing stage, the multi-frame alignment stage, the demosaic stage, the tone-mapping stage, and the noise reduction stage; and to train the machine learning-based image processing engine, the at least one processing device is configured to train the machine learning-based image processing engine to perform one or more tasks associated with one or more of the stages in the multi-frame processing pipeline that follow the specified stage.

15. A method comprising:
obtaining multiple input image frames; and
generating a blended image based on the input image frames using a machine learning-based image processing engine;
wherein the machine learning-based image processing engine comprises a machine learning model that has been trained using a ground truth image and synthetic training data that is generated based on (i) the ground truth image, (ii) a modeled optical blur, (iii) a modeled global motion, (iv) a color filter array, and (v) a noise model associated with at least one imaging sensor.

16. The method of claim 15, wherein the machine learning model is trained by:
obtaining the ground truth image;
generating multiple image frames using the ground truth image, the modeled optical blur, and the modeled global motion;
generating multiple mosaic image frames using the image frames and the color filter array;
generating multiple raw input image frames using the mosaic image frames and the noise model;
providing the raw input image frames to a multi-frame processing pipeline in order to generate the synthetic training data; and
training the machine learning-based image processing engine using the ground truth image and the synthetic training data.

17. The method of claim 16, wherein:
applying the modeled optical blur to the ground truth image comprises applying an optics model to the ground truth image, the optics model representing the modeled optical blur that is associated with the at least one imaging sensor;
generating the mosaic image frames comprises applying the color filter array to the image frames in order to convert the image frames into red-green-blue (RGB) mosaic image frames; and
generating the raw input image frames comprises applying noise to the mosaic image frames using the noise model based on one or more parameters of the at least one imaging sensor.

18. The method of claim 16, wherein:
the multi-frame processing pipeline comprises multiple stages; and
providing the raw input image frames to the multi-frame processing pipeline in order to generate the synthetic training data comprises:
tapping a specified one of the stages in the multi-frame processing pipeline based on at least one task to be performed by the machine learning-based image processing engine; and
obtaining an input or an output of the specified stage as the synthetic training data.

19. The method of claim 18, wherein:
the multi-frame processing pipeline comprises a raw image frame processing stage, a multi-frame alignment stage, a demosaic stage, a tone-mapping stage, and a noise reduction stage;

the specified stage represents one of the raw image frame processing stage, the multi-frame alignment stage, the demosaic stage, the tone-mapping stage, and the noise reduction stage; and the machine learning-based image processing engine is trained to perform one or more tasks associated with one or more of the stages in the multi-frame processing pipeline that follow the specified stage.

20. The method of claim 15, wherein the machine learning model is trained to perform at least one of: raw image frame processing, multi-frame alignment, demosaicing, tone-mapping, and noise reduction.

* * * * *